(12) United States Patent
David

(10) Patent No.: US 7,971,904 B2
(45) Date of Patent: Jul. 5, 2011

(54) ROLLOVER PROTECTION SYSTEM

(75) Inventor: Michael David, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 485 days.

(21) Appl. No.: 11/471,005

(22) Filed: Jun. 20, 2006

(65) Prior Publication Data

US 2007/0290493 A1 Dec. 20, 2007

(51) Int. Cl.
*B60R 21/013* (2006.01)

(52) U.S. Cl. ........................ 280/756; 296/102

(58) Field of Classification Search .............. 180/89.12; 280/756; 296/102, 190.03
See application file for complete search history.

(56) References Cited

U.S. PATENT DOCUMENTS

| | | | | |
|---|---|---|---|---|
| 3,188,111 A * | 6/1965 | Ells et al. | | 280/748 |
| 3,259,211 A * | 7/1966 | Ryskamp | | 280/756 |
| 3,336,074 A * | 8/1967 | Barnes et al. | | 296/102 |
| 3,563,401 A * | 2/1971 | Gandolfo | | 414/634 |
| 3,584,897 A * | 6/1971 | Frantz et al. | | 280/756 |
| 3,632,134 A | 1/1972 | Babbitt, Jr. et al. | | 280/150 C |
| 3,917,310 A * | 11/1975 | Mitsuishi | | 280/756 |
| 4,102,537 A | 7/1978 | Takahashi et al. | | |
| 4,158,460 A * | 6/1979 | White | | 280/756 |
| 4,362,220 A * | 12/1982 | Baston | | 180/68.5 |
| 4,592,571 A * | 6/1986 | Baumann et al. | | 280/756 |
| 4,666,183 A * | 5/1987 | Azzarello | | 280/756 |
| 4,877,265 A | 10/1989 | DeBraal et al. | | 280/756 |
| 4,949,991 A | 8/1990 | Ludwig | | 280/756 |
| 5,042,835 A * | 8/1991 | Burns | | 280/756 |
| 5,129,676 A * | 7/1992 | Sheehan | | 280/756 |
| 5,503,430 A * | 4/1996 | Miki et al. | | 280/756 |
| 5,779,272 A * | 7/1998 | Panek et al. | | 280/756 |
| 5,839,758 A * | 11/1998 | Finch et al. | | 280/756 |
| 6,089,343 A * | 7/2000 | Brewer | | 180/311 |
| 6,237,952 B1 | 5/2001 | Burckhartzmeyer et al. | | 280/756 |
| 6,460,886 B2 | 10/2002 | Osuga et al. | | 280/756 |
| 6,729,431 B2 * | 5/2004 | Osuga et al. | | 180/312 |
| 7,152,903 B2 * | 12/2006 | Westendorf et al. | | 296/102 |
| 7,222,882 B2 * | 5/2007 | Boucher | | 280/756 |
| 7,240,472 B2 * | 7/2007 | Evers | | 56/202 |
| 2007/0252371 A1 * | 11/2007 | Schlup | | 280/756 |

FOREIGN PATENT DOCUMENTS

| | | | |
|---|---|---|---|
| EP | 458761 A1 * | 11/1991 | |
| EP | 1197399 A2 * | 4/2002 | |
| EP | 1484452 | 12/2004 | |
| FR | 1372793 | 9/1964 | |
| FR | 2541953 A1 * | 9/1984 | |
| GB | 2175259 A * | 11/1986 | |
| JP | 05112193 A * | 5/1993 | |
| JP | 06008860 A * | 1/1994 | |
| JP | 06048259 A * | 2/1994 | |

* cited by examiner

*Primary Examiner* — Paul N Dickson
*Assistant Examiner* — Laura Freedman

(57) ABSTRACT

A rollover protection system for an off road vehicle includes a pair of lower legs, each lower leg having an arced portion and a horizontal portion connected to the vehicle frame. The upper section of the rollover protection system is pivotably connected to the lower legs, so that it may pivot to a lowered position in which the upper section fits around the rear mounted engine and is within the rear dimensions of the vehicle.

12 Claims, 3 Drawing Sheets

ROLLOVER PROTECTION SYSTEM

FIELD OF THE INVENTION

The present invention relates to rollover protection systems for off road vehicles, and more specifically to rollover protection systems (ROPS) for tractors, lawn and garden vehicles, and riding mowers.

BACKGROUND OF THE INVENTION

For safety reasons, tractors, lawn and garden vehicles, and riding mowers may be provided with some form of rollover protection system, or ROPS, to prevent the vehicle from crushing the operator if it accidentally rolls over. The ROPS should be capable of supporting the forces generated by the weight of the vehicle in the event of a rollover, maintaining free space for the operator to reduce the danger of injury.

If a cab is provided, the ROPS may be built into the cab. If a cab is not provided, the ROPS may consist of a generally U-shaped crossbar located above the head of the operator, and legs connected to the vehicle frame.

The ROPS may be straight tubing, and brackets may be welded to the legs or lower section to connect the ROPS to the vehicle frame. The legs or lower section of the ROPS may be welded in a position perpendicular to the vehicle frame. A ROPS is designed to absorb energy from the weight of the vehicle, and the brackets transfer energy from the ROPS to the vehicle frame. As a result, the welded brackets may need to be reinforced to withstand the transfer of energy, adding to the cost of the vehicle. A ROPS is needed that can provide greater energy absorption and have less welded bracketry.

Some ROPS may be adjustable to decrease the height of the ROPS in certain situations. For example, U.S. Pat. No. 4,877,265 relates to a ROPS that is easily adjustable between different heights, and U.S. Pat. No. 4,949,991 relates to a ROPS that can be folded from a raised position to a lowered position.

Some riding mowers, such as zero turn radius mowers, have a folding ROPS connected to the vehicle frame on each side of an operator station. However, the vehicle may have a rear mounted engine that can block the ROPS from folding down completely. The folded upper section of the ROPS may extend beyond the rear dimensions of the vehicle frame and/or body. As a result, the folded ROPS increases the length and/or height of the vehicle. The increased dimensions add to the square footage needed for vehicle storage and vehicle transportation on a truck or trailer, and also may hinder mowing in and around tight spaces such as around trees with overhanging limbs. A ROPS is needed for an off road vehicle such as a riding mower with a rear-mounted engine that can be folded down to a lowered position to minimize vehicle length and/or height.

SUMMARY OF THE INVENTION

A ROPS for an off road vehicle such as a riding mower is provided having a pair of lower legs that are bent in an arced shape, and a horizontal portion mounted to the vehicle frame. The upper section of the ROPS may be folded down around the rear-mounted engine so that it is within the rear dimensions of the vehicle.

DESCRIPTION OF THE PREFERRED EMBODIMENT

Figure 1:
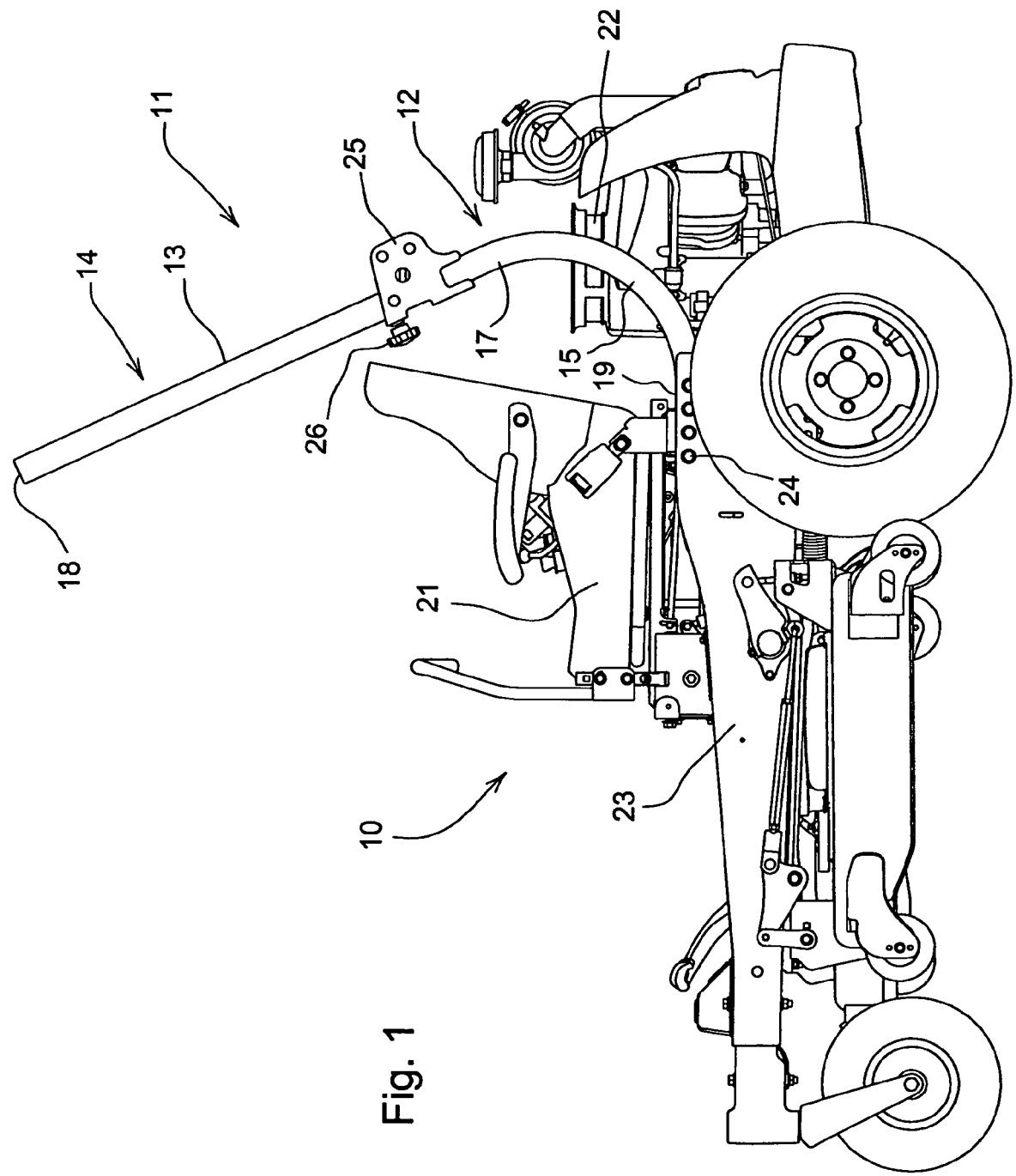
FIG. 1 is a side view of a riding mower having the ROPS according to one embodiment of the invention.
Figure 2:
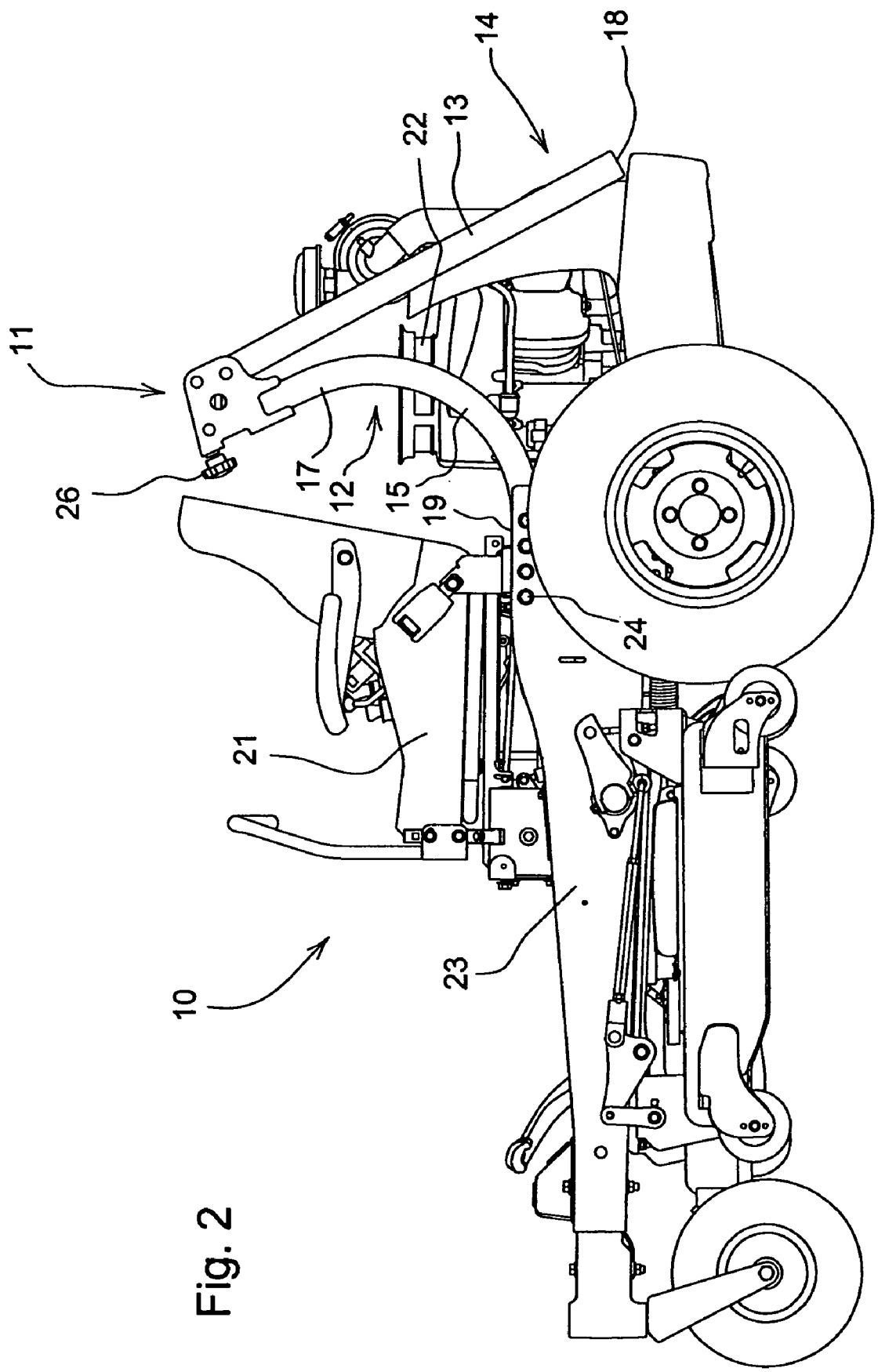
FIG. 2 is a side view of a riding mower with a ROPS in the lowered position according to one embodiment.
Figure 3:
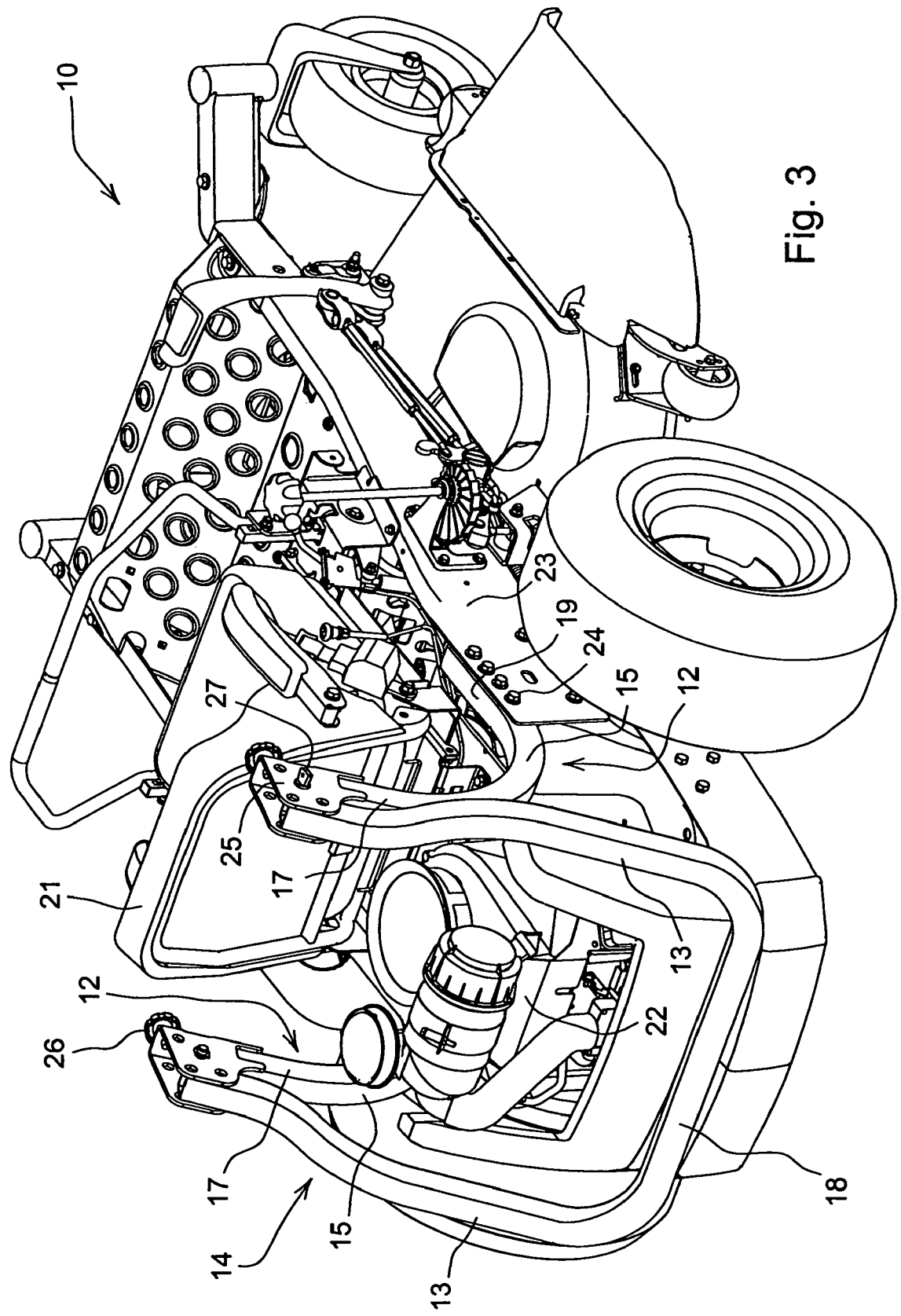
FIG. 3 is a rear perspective view of a riding mower with a lowered ROPS according to one embodiment.

As shown in FIGS. 1-3, riding mower 10 includes ROPS 11 fastened to vehicle frame 23. In the embodiment shown, riding mower 10 is a zero turn radius mower, and ROPS 11 is mounted to frame 23 on each side of operator station 21 and adjacent or in front of rear mounted engine 22. The ROPS may be tubular steel bent into a desired shape, including a pair of lower legs 12 hinged to upper section 14 having upright portions 13 and cross bar 18.

In one embodiment, each of lower legs 12 may include an arced or curved portion 15 between an upright portion 17 and a horizontal or nearly horizontal portion 19. The arced portion may have a radius of curvature of between about 1 foot and about 3 feet, and may form an arc of between about 60 degrees and about 90 degrees.

In one embodiment, ROPS 11 may be connected to the vehicle frame on either side of the operator station by inserting ant tightening bolts or other threaded fasteners 24 through holes in each horizontal portion 19 of lower legs 12, and vehicle frame 23. The angle measured between the upright portion and horizontal portion of each leg may be between about 60 degrees and about 90 degrees.

In one embodiment, the arced portion of each lower leg may provide high energy absorption, effectively isolating the energy absorption to the ROPS. The horizontal portion of each lower leg 12 may be mounted and fastened to vehicle frame 23 by inserting bolts 24 directly through holes drilled through the ROPS tubing and vehicle frame, without a bracket between the tubing and frame. The ROPS of the present invention eliminates bracketry used in previously known ROPS to transfer energy from the ROPS tubing to the frame.

In one embodiment, the upper section 14 of the ROPS may be hinged to each of lower legs 12 with pivot bracket 25. The pivot bracket allows the upper section of the ROPS to be folded down and lowered so that the upright portions 13 of the upper section fit around each side of the rear-mounted engine. For example, the measurement between the upright portions 13 may be greater than the width of the engine at the lowered position. The upright portions may be bent so that the measurement between at least part of the upright portions is greater than the measurement between the upright portions of the lower legs. Additionally, in one embodiment, the pivot bracket may be lower than the top of the seat back.

In the lowered position, the ROPS of the present invention provides compact overall machine height and length for storage and transportation. The ROPS also aids in mowing in and around tight spaces such as around trees with overhanging limbs. Additionally, the pivot bracket may include a knob 26 that may be retracted to allow folding the upper section of the ROPS down. Pin 27 also may be used to secure the upper section of the ROPS in the raised position.

In one embodiment, pivot bracket 25 may be provided at a location such that upper section 14 has a greater total length than the combined lengths of lower legs 12. Additionally, the pivot bracket may be located so that cross bar 18, if the ROPS is in the folded position, may be below the horizontal mounting point of the lower legs. The upper section may be folded to the lowered position so that it is within the dimensions of the rear end of the vehicle, and does not extend rearwardly past the vehicle frame and body.

Having described the preferred embodiment, it will become apparent that various modifications can be made without departing from the scope of the invention as defined in the accompanying claims.

The invention claimed is:

1. A rollover protection system for a riding mower, comprising:
   a pair of lower legs, each lower leg having an arced portion between an upright portion and a horizontal portion, with only the horizontal portion fixedly mounted to the riding mower;
   an upper section connected to the lower legs and having a pair of upright portions and a cross bar; wherein the upper section is pivotably connected to the lower legs; and
   wherein the riding mower has a rear mounted engine, the upper section is pivotable to a lowered position in which the upright portions of the upper section are on each side of the rear mounted engine.

2. A rollover protection system for a riding mower, comprising:
   a pair of lower legs, each lower leg having an arced portion between an upright portion and a horizontal portion, with only the horizontal portion fixedly mounted along a longitudinal frame member of the riding mower by a plurality of fasteners; and
   an upper section connected to the lower legs and having a pair of upright portions and a cross bar; wherein the upper section is pivotably connected to the lower legs; and
   wherein the upper section is pivotable to a lowered position such that the cross bar is below the horizontal portion of the lower legs.

3. A rollover protection system for a riding mower comprising:
   a pair of bent tubular steel lower legs, each leg being a one-piece tubular steel member having a horizontal portion mounted parallel to a frame of the riding mower on either side of an operator station, a curved portion integral with the horizontal portion, and a plurality of fasteners extending horizontally between only the horizontal portion of the one-piece tubular steel member and the frame;
   a tubular steel upper section pivotably connected to the lower legs and foldable to a lowered position.

4. The rollover protection system of claim 3 wherein the upper section is foldable to a lowered position within the dimensions of a rear end of the riding mower.

5. A rollover protection system for a riding mower comprising:
   a pair of bent tubular steel lower legs, each leg having a horizontal portion mounted parallel to a frame of the riding mower on either side of an operator station, a curved portion integral with the horizontal portion, and a plurality of fasteners extending between only the horizontal portion and the frame;
   a tubular steel upper section pivotably connected to the lower legs and foldable to a lowered position;
   wherein the riding mower has an operator seat with a seat back, and the upper section is pivotably connected to the lower legs below the top of the seat back.

6. The rollover protection system of claim 3 wherein the upper section includes a pair of upright portions and a crossbar.

7. A rollover protection system for a riding mower comprising:
   a pair of bent tubular steel lower legs, each leg having a horizontal portion mounted parallel to a frame of the riding mower on either side of an operator station, a curved portion integral with the horizontal portion, and a plurality of fasteners extending between only the horizontal portion and the frame;
   a tubular steel upper section pivotably connected to the lower legs and foldable to a lowered position; wherein the upper section includes a pair of upright portions and a crossbar; and
   wherein the upper section is foldable to a lowered position in which the crossbar is below the horizontal portions of the lower legs.

8. A rollover protection system for a riding mower comprising:
   a pair of bent tubular steel lower legs, each leg having a horizontal portion on either side of an operator station, a curved portion integral with the horizontal portion, and a plurality of fasteners extending between only the horizontal portion and the riding mower;
   a tubular steel upper section pivotably connected to the lower legs and foldable to a lowered position;
   wherein the upper section includes a pair of upright portions and a crossbar;
   the riding mower having a rear mounted engine, and wherein the upright portions of the upper section are on each side of the rear mounted engine in the lowered position.

9. A rollover protection system for a riding mower comprising:
   a pair of lower legs on each side of an operator station, each lower leg including a horizontal portion and an arced portion extending from the horizontal portion, and a plurality of fasteners securing only the horizontal portion to the riding mower;
   an upper section pivotably connected to the lower legs with a pair of brackets, the upper section foldable to a lowered position around a rear mounted engine behind the operator station, the upper section including a crossbar below the lower legs in the lowered position.

10. The rollover protection system of claim 9 wherein the total length of the upper section is greater than the total combined lengths of the pair of lower legs.

11. The rollover protection system of claim 9 wherein the upper section has a pair of upright portions; the measurement between at least part of the upright portions being greater than the width of the engine at the lowered position.

12. The rollover protection system of claim 9 wherein the lower legs are bent tubular steel.

* * * * *